United States Patent

Tsunoda

[11] Patent Number: 6,059,236
[45] Date of Patent: May 9, 2000

[54] TANGENTIAL FORCE PANEL FOR ACTIVE FLOW CONTROL OF A CONDUCTIVE FLUID

[75] Inventor: Stanley I. Tsunoda, Encinitas, Calif.

[73] Assignee: General Atomics, San Diego, Calif.

[21] Appl. No.: 09/099,852

[22] Filed: Jun. 19, 1998

[51] Int. Cl.[7] .................................................. B64C 21/00
[52] U.S. Cl. .......................... 244/201; 244/204; 244/130
[58] Field of Search ..................................... 244/204, 205, 244/198, 130, 201

[56] References Cited

U.S. PATENT DOCUMENTS

| | | | |
|---|---|---|---|
| 2,946,541 | 7/1960 | Boyd | 244/42 |
| 3,095,163 | 6/1963 | Hill | 244/12 |
| 3,162,398 | 12/1964 | Clauser et al. | 244/14 |
| 3,360,220 | 12/1967 | Meyer | 244/42 |
| 4,516,747 | 5/1985 | Lurz | 244/204 |
| 5,040,560 | 8/1991 | Glezer et al. | 137/13 |
| 5,273,465 | 12/1993 | Meng | 114/337 |
| 5,320,309 | 6/1994 | Nosenchuck et al. | 244/205 |
| 5,359,574 | 10/1994 | Nadolink | 244/204 |
| 5,437,421 | 8/1995 | Nosenchuck et al. | 244/205 |
| 5,439,191 | 8/1995 | Nichols et al. | 244/169 |
| 5,791,275 | 8/1998 | Bandyopadhyay | 244/205 |

OTHER PUBLICATIONS

Nosenchuck; "Boundary Layer Control Using the Lorentz Force", *Department of Mechanical and Aerospace Engineering*, (May 1997).

Henoch, et al.; "Experimental Investigation of a Salt Water Turbulent Boundary Layer Modified by an Applied Streamwise Magnetohydrodynamic Body Force", *Phys. Fluids*, vol. 7 (6) pp. 1371–1383 (Jun. 1995).

*Primary Examiner*—Galen L. Barefoot
*Attorney, Agent, or Firm*—Fitch, Even, Tabin & Flannery

[57] ABSTRACT

Magnetic and electric fields are used in a controlled manner to create equal and oppositely-directed Lorentz forces tangential to the surface of a control tile that affect the flow of a conductive fluid near the boundary layer of the control tile, or a matrix of control tiles, immersed in a conductive fluid. The control tiles are combined to form control cells, with each control cell including a pair of electrodes and at least one permanent magnet. The pair of electrodes are coupled to a current source which biases the electrodes to cause an electrical current to flow from a positive electrode (anode), through the conductive fluid in which the cell electrodes are immersed, to a negative electrode (cathode). The current source may be time multiplexed to better control the direction of the current flow between adjacent electrodes. The permanent magnet generates a magnetic field which is positioned to interact with the electrical current where the magnetic field is strongest, thereby creating a strong tangential Lorentz force. Such force influences the flow of the conductive fluid, near the boundary of the control tile, e.g., reduces drag of the fluid as it flows over the tile surface. The invention may be used, e.g., within the hull of an ocean-going ship to reduce the drag of the sea water passing over the surface of the hull.

44 Claims, 9 Drawing Sheets

TANGENTIAL FORCE PANEL FOR ACTIVE FLOW CONTROL OF A CONDUCTIVE FLUID

BACKGROUND OF THE INVENTION

The present invention relates to systems and methods for controlling the flow of a conductive fluid over a surface, and more particularly to a system and method that uses magnetic and electric fields to create Lorentz forces that affect the flow of a conductive fluid in a controlled manner near the boundary layer of a control tile, or a matrix of control tiles, immersed in the conductive fluid.

Conductive fluids naturally occur in many different settings. Note, that for purposes of this application, the term "fluid" is used in its broad scientific sense to connote a liquid or a gas. Wherever such a conductive fluid is encountered, there is typically a need or desire to move a vessel or other object through the conductive fluid using a minimal amount of energy. One way to meet this need is to design such vessel or object so that the conductive fluid flows over the surface thereof with a minimal amount of drag.

Perhaps the most common example of a conductive fluid is sea water, which covers a significant percentage of the earth's surface. Ocean-going vessels traveling through sea water, e.g., ships or submarines, must exert significant amounts of energy in order to successfully navigate through the sea water at a suitable speed. Hence, much attention has been directed over the years to optimally design the hull or shape of an ocean-going vessel in order reduce the drag (friction) the fluid encounters as it passes over the surface of the vessel. Despite such efforts, however, there remains a continual need to further reduce the drag encountered by conductive fluids passing over the surface of such vessels to thereby make the movement of such vessels through the fluid more efficient.

As is known in the art, a viscous fluid, and a body completely immersed in the fluid, form a boundary layer at the body's surface when the fluid and the body move relative to each other. That is, the layer of fluid in contact with the body is essentially at rest, while in an area removed from the body, the fluid is moving at its free-stream velocity. The region between the body and that area is known as a boundary layer. Where the fluid is a conductive fluid, electromagnetic forces may be introduced into the boundary layer in an attempt to alter the boundary layer characteristics. See, e.g., U.S. Pat. No. 5,437,421.

There remains a need, however, to more favorably alter the characteristics of the boundary layer than has heretofore been achieved. That is, there remains a need to optimally alter or affect the boundary characteristics in a way that most significantly reduces or otherwise alters the drag of the fluid as it passes over the body.

SUMMARY OF THE INVENTION

The present invention addresses the above and other needs by using magnetic and electric fields in a controlled manner so as to create Lorentz forces that affect the flow of a conductive fluid near the boundary layer of a control tile, or a matrix of control tiles, immersed in a conductive fluid. More specifically, the Lorentz forces created by the invention combine to form a vortex wavefront, referred to herein as a "roller", that is transverse to the fluid flow direction, which vortex wavefront advantageously reduces drag of the conductive fluid over the matrix of control tiles. When such matrix of control tiles is formed or mounted on a surface immersed within a conductive fluid, the invention may thus be used to render movement of such surface through such conductive fluid more efficient, i.e., with less drag.

The control tiles used with the invention are combined to form control cells, with each control cell including a pair of electrodes and at least one permanent magnet. The pair of electrodes are coupled to a current source which biases the electrodes to cause an electrical current to flow from a positive electrode (anode), through the conductive fluid in which the cell electrodes are immersed, to a negative electrode (cathode). The current source may be time multiplexed to better control the direction of the current flow between adjacent electrodes. The permanent magnet(s) generates a magnetic field which interacts with the electrical current to create a Lorentz force that influences the flow of the conductive fluid, near the boundary of the control tile, e.g., reduces drag of the fluid as it flows over the tile surface.

In accordance with an important aspect of the invention, the magnetic field generated by the magnets associated with the control tiles is employed in an efficient manner. More particularly, the normal component of the Lorentz force is generated where the magnetic field is strongest.

In accordance with another important aspect of the invention, an optimum magnet configuration is employed which utilizes a middle magnet for each control tile that allows the strongest Lorentz forces that are produced to be tangential to the tile surface. thereby aiding in a more developed "roller" to be produced.

A primary application of the invention is to place or form such control tiles or cells within the hull of an ocean-going ship, thereby reducing the drag of the sea water passing over the surface of the hull, thereby making movement of the ocean-going ship through the sea water more efficient. It is to be emphasized, however, that the invention is not limited to use only within the hull of a ship. Rather, the invention may be used for any application where a surface must be moved or propelled within a conductive fluid, and where such conductive "fluid" may comprise either a liquid or a gas. Thus, for example, the invention could also be used within or on the shell surface of an aircraft, e.g., a space shuttle craft or an airplane, where such aircraft must pass through an ionically-charged atmosphere.

There are many other uses and applications for the drag reduction achieved by the invention, in addition to those enumerated above. For example, a reduction is drag through use of the present invention may be used to improve the flow of conductive fluids through a pipe. The invention may also be used to increase drag in order to achieve enhanced braking of ocean-going vessels, or of aircraft or spacecraft traveling through an ionized medium. Additionally, decreased or increased drag (achieved through use of the invention) provides an effective way to achieve rudderless steering of ocean-going vessels, or of aircraft or spacecraft that travel through an ionized medium. Indeed, there are many applications for the present invention. Any application where a reduced fluid drag, or a controlled fluid drag, is required or desired, may benefit from the invention.

One embodiment of the invention may be characterized as apparatus for affecting the flow of a conductive fluid over a control surface. Such apparatus includes: (a) a matrix of electrodes spread over a front surface of the control surface; (b) means for biasing (or energizing) selected electrodes in columns so that the polarity of the electrodes in a given electrode column alternates between a positive electrode and a negative electrode, and so that an electrical current flows from a positive electrode in the electrode column through the conductive fluid to adjacent negative electrodes on either side of the positive electrode in the electrode column, and wherein the biasing means further includes means for minimizing lateral current flow from one electrode column to another; and (c) means for generating a magnetic field having magnetic flux lines substantially orthogonal to the electrical current flowing through the conductive fluid and substantially perpendicular to the control surface near a boundary layer between the control surface and conductive fluid. The interaction of the electrical current and magnetic field creates a Lorentz force substantially orthogonal to both the electrical current and magnetic flux lines and substantially tangential to the control surface. Such tangential Lorentz forces are produced in equal and oppositely-directed pairs. Advantageously, such Lorentz force affects the flow of the conductive fluid over the control surface in a way that reduces drag.

Another embodiment of the invention may be characterized as an apparatus or method for controlling the flow of a conductive fluid over a control surface immersible within the conductive fluid. Such apparatus or method includes means for propelling the control surface through the conductive fluid; and means for electromagnetically generating at least one vortex wavefront, or "roller", on the control surface that passes over the control surface as the control surface moves through the conductive fluid. It is this vortex wavefront, or roller, that helps reduce the drag associated with the flow of the conductive fluid over the control surface. In accordance with one aspect of the invention, the vortex wavefront, or roller, is formed at right angles to the direction of fluid flow over the control surface.

Yet another embodiment of the invention may be characterized as an apparatus for controlling the flow of a conductive fluid over a control surface. In broad terms, such apparatus includes a matrix of electrodes spread over the control surface. Further included is a means for biasing selected electrodes in pairs so that two of the electrodes within the matrix of electrodes function as an electrode pair, with each electrode pair having an anode electrode and a cathode electrode. This arrangement allows an electrical current to flow from the anode electrode of each electrode pair through the conductive fluid to the cathode electrode of the electrode pair. There is also included a means for generating a magnetic field having magnetic flux lines that are transverse to the electrical current flowing through the conductive fluid. The combination of the electrical current and the magnetic flux cause a Lorentz force to be created that is transverse to both the electrical current and magnetic flux lines. This Lorentz force affects the flow of the conductive fluid over the control surface. More specifically, the biasing means includes time multiplexing means for time multiplexing the electrical current to assure a desired sourcing/sinking relationship of the electrical current between selected electrode pairs exists so that a coordinated pattern of Lorentz forces is created that affects the flow of the conductive fluid over the control surface in a desired manner, e.g., to reduce drag.

In accordance with an important aspect of the invention, the time multiplexing means forces electrical current sourced from one anode electrode to be sunk at a desired adjacent cathode electrode and not at a non-desired adjacent cathode electrode. Carefully controlling which electrodes source and sink current in this manner through the use of the time multiplexing means advantageously allows the induced Lorentz forces to create a roller wavefront that is at a desired angle, e.g., transverse, relative to the direction of fluid flow over the control surface. It is this roller that is primarily responsible for reducing the drag associated with the fluid flow over the control surface.

It is a feature of the invention to provide beneficial control of fluid motion over a surface, e.g., to reduce drag as a conductive fluid flows over the surface.

It is another feature of the invention to provide a time-multiplexed current driver for use with a matrix of electrodes on a control surface immersible in a conductive fluid which, in combination with a magnetic field, steers resulting Lorentz forces for beneficial purposes. More particularly, it is a feature of the invention to provide such Lorentz forces so as to create a vortex wavefront that significantly reduces drag as the conductive fluid passes over the control surface.

It is yet another feature of the invention to provide a control surface, immersible in a conductive fluid such as seawater, which when electromagnetically energized, exhibits a reduced drag as such surface moves through the conductive fluid.

It is still an additional feature of the invention to provide a control cell configuration wherein the normal component of the Lorentz force is largest where the magnetic field is strongest, thereby utilizing the magnetic field in an efficient manner.

It is another feature of the invention to provide a control cell configuration wherein curved magnets need not be used with a cylindrical or other curve-shaped body which houses the control cells.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1A:
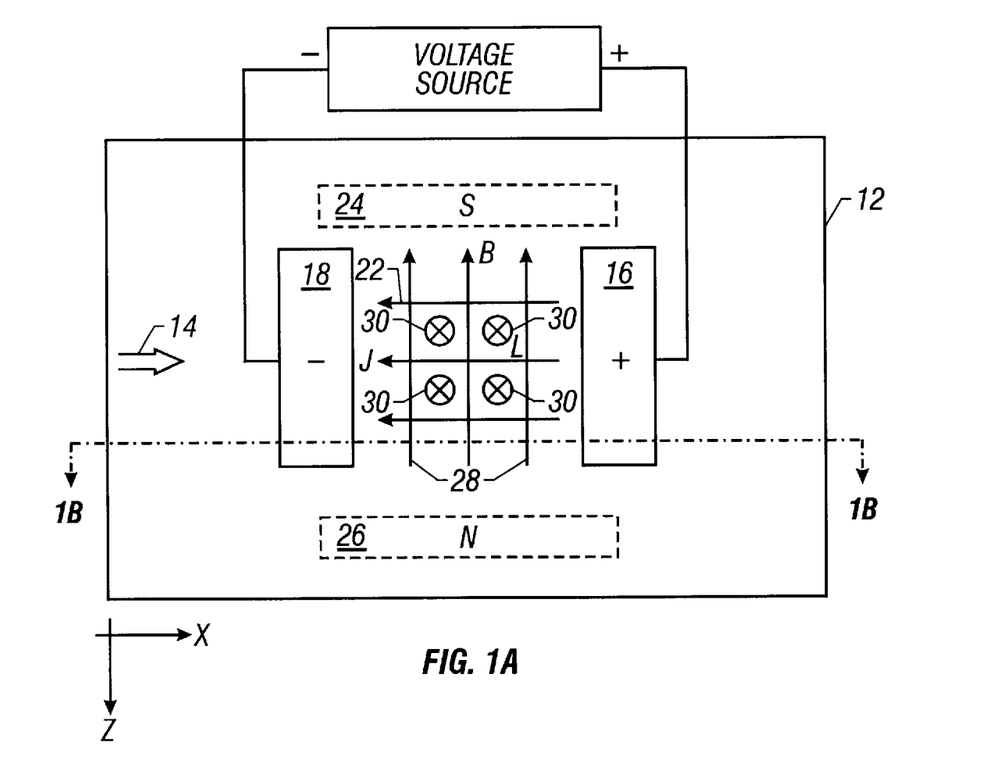
FIG. 1A shows a plan view of a conventional single cell fluid control device.
Figure 1B:
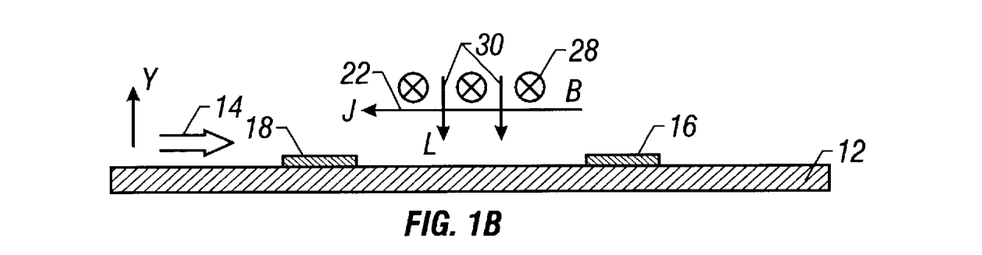
FIG. 1B shows a sectional view of the control device of FIG. 1A taken along the line 1B—1B.

To better understand and appreciate the present invention, it will first be beneficial to have a basic understanding of how fluid control has heretofore been attempted. Some basic teachings relative to the prior art were presented above in the Background portion of this application. Additional detail concerning the manner in which fluid flow control may be attempted is illustrated in FIGS. 1A and 1B. FIG. 1A shows a plan view of a conventional single cell fluid control device, and FIG. 1B shows a sectional view of the prio1 art control device of FIG. 1A taken along the line 1B—1B. The single cell device is formed on a suitable panel or substrate 12. Such panel 12 is designed to be exposed to fluid flow, represented in FIGS. 1A and 1B by the double arrow 14. That is, as drawn in FIGS. 1A and 1B, it is contemplated that fluid will flow over the panel 12 from left to right.

A first pair of electrodes 16, 18 is placed on a top surface (the surface exposed to the fluid flow) of the panel 12. The electrode 16 is electrically connected to the positive side of a voltage source 20, and the electrode 18 is electrically connected to the negative side of the voltage source 20. Thus, in the presence of a conductive fluid, an electric current, J, represented in the figures by the vector arrows 22, will thus flow from the positive electrode 16 to the negative electrode 18.

Positioned behind the panel 12 are a pair of permanent magnets 24 and 26. (These magnets 24 and 26 have been omitted from FIG. 1B for clarity.) The south pole S of the magnet 24 is positioned closest to the back side of the panel 12, while the north pole N is likewise positioned closest to the back side of the panel 12. A magnetic field, B, is thus established by the presence of the magnets 24 and 26. This magnetic field B has a polarity (direction) as illustrated by the vector arrows 28 in FIGS. 1A and 1B. Note that in FIG. 1B, the magnetic field B points into the paper, and thus the vector arrows 28 representing the magnetic field B are illustrated by the symbol ⊗ (an "x" within a circle, which is symbolic of looking at the back end of an arrow). If a vector arrow were pointing out of the plane of the paper, it would be represented by the symbol ⊙ (a dot within a circle, symbolic of looking at the front end of an arrow).

As is evident from FIGS. 1A and 1B, the electric current J and the magnetic field B are established so as to be substantially transverse (perpendicular) to each other. As is known in the art, whenever an electric current J is acted upon by a magnetic field B, a Lorentz force, L, is established that is perpendicular to both the current J and the magnetic field B. This Lorentz force L is represented in FIGS. 1A and 1B by the vector arrows 30. As seen in FIG. 1A, the vector arrows 30 representing the Lorentz Force L are directed into the plane of the paper, and are thus represented by the symbol ⊗; while in FIG. 1B, the Lorentz Force is directed downward (in the "y" direction, of the x-y-z coordinate system illustrated in FIGS. 1A and 1B), toward the panel 12.

Figure 2A:
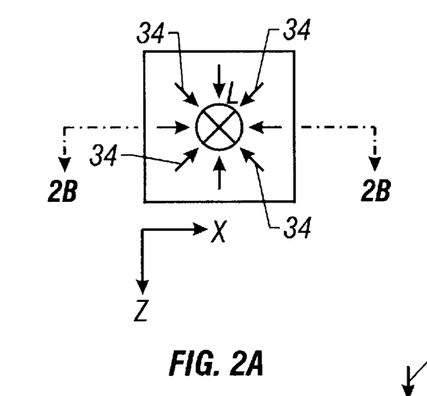
FIG. 2A illustrates a plan view of a simplified representation of a single-cell fluid control device having a force vector L centered in the cell and oriented in the −y direction.
Figure 2B:
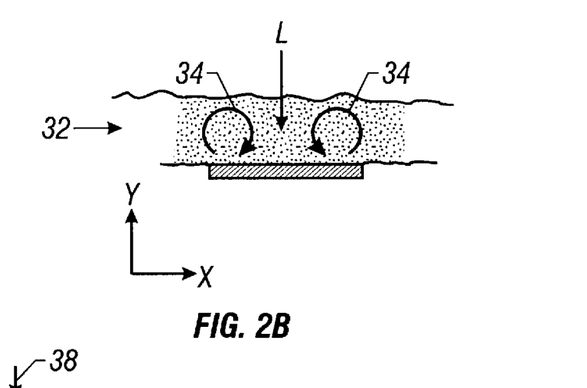
FIG. 2B is a sectional view of the simplified cell of FIG. 2A taken along the line 2B—2B, and illustrates the vortexes that are created in a fluid layer above the cell in the presence of such vector L.

Turning next to FIGS. 2A, 2B, 2C, 2D and 2E, there is shown a sequence of diagrams that illustrate the affect the Lorentz force, L, also referred to herein as a force vector L, has on a fluid that passes over the surface of cell, or matrix of cells, whereat the Lorentz force L is present. FIG. 2A illustrates a plan view of a simplified representation of a single-cell fluid control device having a force vector L centered in the cell and oriented in the -y direction (into the plane of the paper); while FIG. 2B shows a sectional view of the simplified cell of FIG. 2A taken along the line 2B—2B. As seen in these two figures, the force vector L tends to create a vortex (or whirling pattern) 34 in a fluid layer 32 above the cell.

Figure 2C:
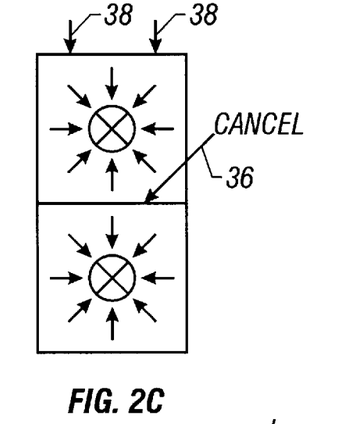
FIG. 2C is a plan view of adjacent cells as in FIG. 2A, and further illustrates the regions where the vortexes cancel and add in the presence of a central vectors L.
Figure 2D:
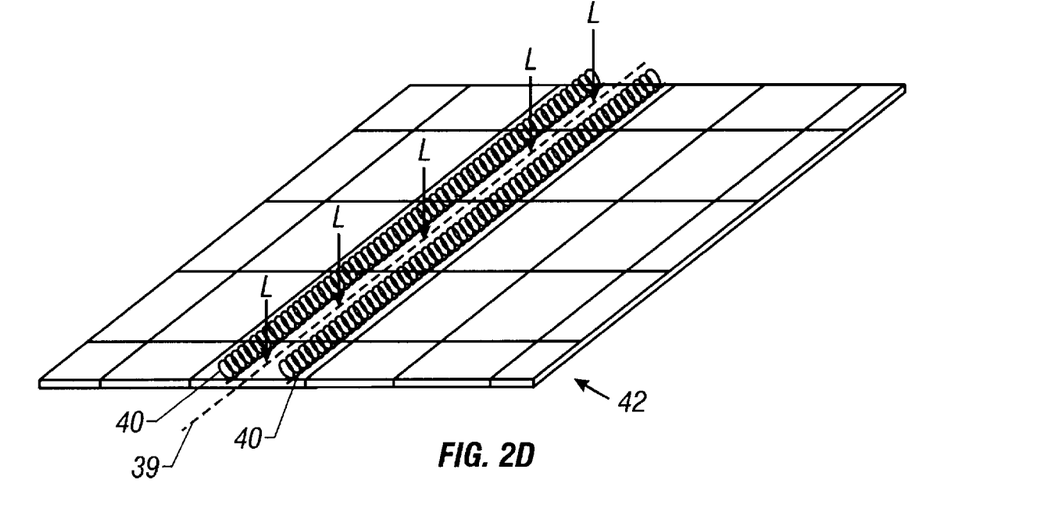
FIG. 2D illustrates a panel formed of fluid control cell devices like that shown in FIG. 2A, and conceptually illustrates how one or more roller vortexes ("rollers") are created when aligned vector Lorentz forces L are applied to the cells, with the rollers having a wavefront that parallels the alignment axis.

For a single cell device, the vortexes 34 are generally created around the force vector L, as though the force vector L were pushing the fluid layer 34 down into the surface in the center of the cell, with the fluid whirling out away from the center point, as seen best in FIG. 2B. When two such cells are positioned adjacent each other, as shown in FIG. 2C, then the whirling motion established within the fluid layer 32 tends to cancel in the region between the adjacent cells, i.e., in the region 36 in FIG. 2C, while it tends to be reinforcing in the region 38 on each side of the center force vector L. The net result is that a plurality of force vectors L, applied along a line 39 to adjacent aligned cells arranged in a matrix 42 of cells, as seen in FIG. 2D, establish a wavefront 40 of turbulent fluid motion, or a vortex wavefront 40, along either side of the force vector line 39, i.e., on either side of the force vectors L. Such wavefront 40 may then be selectively moved along the surface of the matrix 42 by controlling the location where the current vector J is allowed to interact with the magnetic vector B.

Figure 2E:
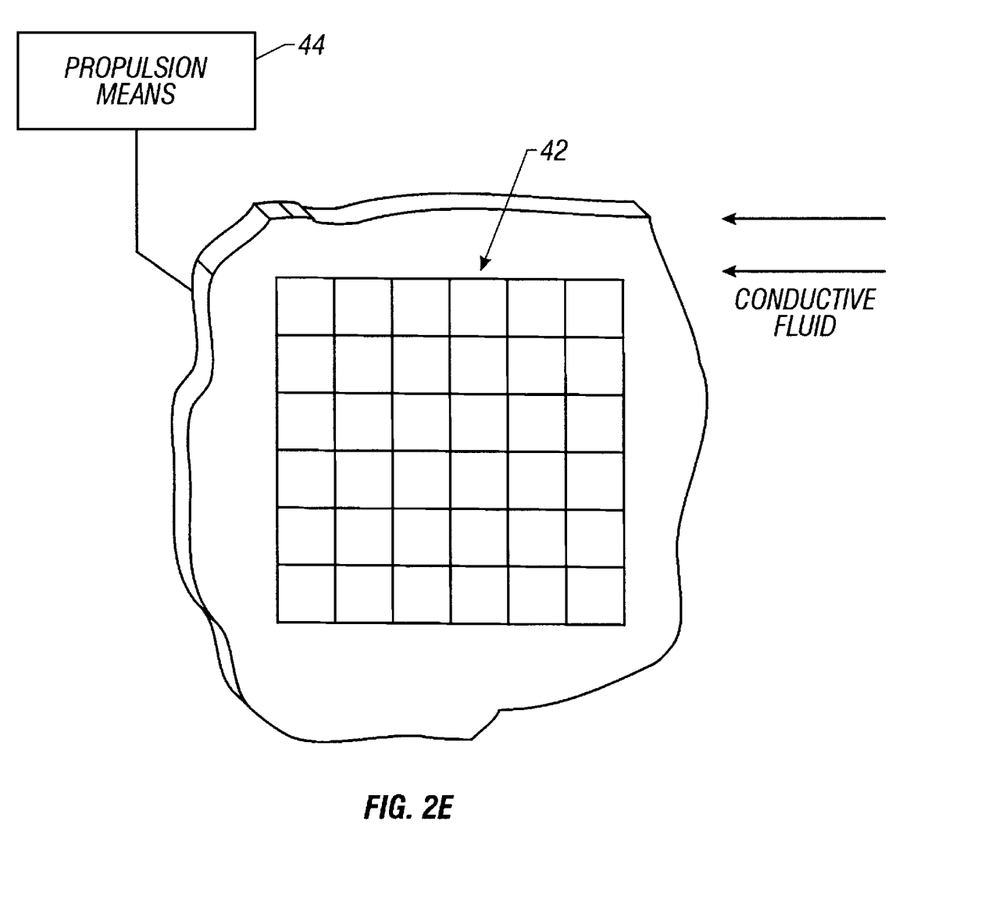
FIG. 2E depicts a panel formed of fluid control cell devices in accordance with the present invention being propelled through a conductive fluid.

Advantageously, a panel or matrix 42 of fluid control cell devices formed in accordance with the present invention, when propelled through a conductive fluid by a suitable propulsion means 44, and when the vortex wavefronts 40 are properly controlled, allows the friction or drag associated with the flow of the conductive fluid over the matrix to be significantly reduced. Thus, as illustrated in FIG. 2E, if the matrix 42 of control cell devices is attached to, or made an integral part of, a vessel structure, e.g., the hull of an ocean-going ship, it is possible, through selective control of the current vectors J which are imposed on the surface of the matrix, to create vortex wavefronts which reduce the drag of the hull as it cuts through the conductive sea water, thereby reducing the amount of energy required to move the vessel through the sea water. Here, and elsewhere throughout this application, the term "control cell device" refers to the electrodes, voltage source, panel or substrate, and magnets used to create a vector force L, when such control cell device is immersed in a conductive fluid.

Figure 3A:
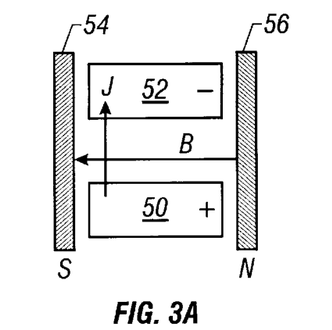
FIG. 3A shows a plan view of one type of basic control cell that may be used with the present invention.
Figure 3B:
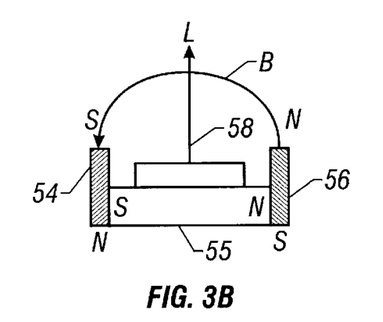
FIG. 3B shows a side view of the basic control cell shown in FIG. 3A.

Turning next to FIGS. 3A and 3B, there is shown one type of basic control cell device that may be made in accordance with the invention. FIG. 3A shows a plan view of one such basic control cell device; and FIG. 3B shows a side view of the basic control cell shown in FIG. 3A. As seen in these figures, electrodes 50 and 52 are energized with a suitable power source (not shown in these figures) so that electrode 50 is positive relative to electrode 52, thereby creating an electric field between the electrodes which causes an electric current to flow from electrode 50 to electrode 52. The flow of such current is represented by the current vector J.

Still with reference to FIGS. 3A and 3B, it is seen that three magnets, 54, 55, and 56, are positioned and polarized so as to create a magnetic field B in the region above the electrodes 50 and 52. Thus, when the electrodes 50 and 52 are immersed within a conductive fluid, so as to create the current vector J, the current vector J reacts with the magnetic field B so as to create the force vector L.

Figure 3C:
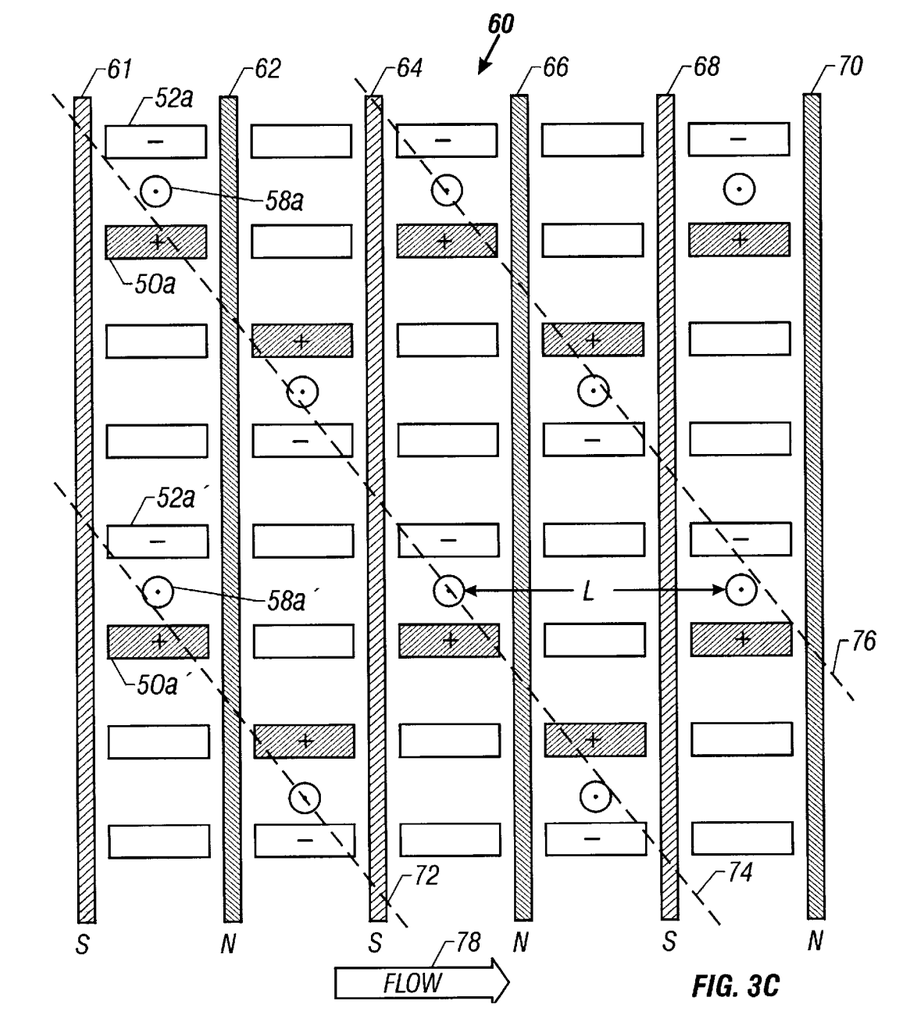
FIG. 3C shows a conventional electromagnetic turbulence control (EMTC) panel made up of the basic cells shown in FIGS. 3A and 3B, and illustrates how, for unperturbed flow from left to right, an outwardly directed Lorentz force (shown as circles with dots inside) is created at each energized cell, which forces create roller wavefronts that parallel the dotted lines.

Next, with reference to the planar view of FIG. 3C, an example is shown of how individual control cells, as shown in FIGS. 3A and 3B, may be arranged in a matrix 60 in order to create a vortex wavefront. In the matrix 60 illustrated in FIG. 3C, elongate magnets 61, 62, 64, 66, 68 and 70 form a boundary between adjacent columns of control cells. Five columns of electrodes are shown, by way of example. Each column of control cells, includes eight electrodes, or four pairs of control cells. In the left column, for example, a first pair of electrodes 52a and 50a is energized so that a force vector 58a is created that points away from the plane of the paper. The second and fourth pair of electrodes in the left column are not energized, while the third pair of electrodes 50a', 52a' is energized, creating a force vector 58a'.

The electrodes in the right (5$^{th}$) and middle (3$^{rd}$) columns of the matrix 60 are energized in the same manner as are the electrodes in the left column. The electrodes in the second and fourth columns, on the other hand, are energized such that the second and fourth pair of electrodes are energized, while the first and third pair of electrodes are not energized.

Still referring to FIG. 3C, it is seen that each pair of energized electrodes allows a force vector L, pointing out of the paper, to be created. In combination, the energization of the electrode pairs shown in FIG. 3C, and the resulting force vectors L, creates a vortex wavefront aligned with the lines 72, 74 and 76.

Figure 3D:
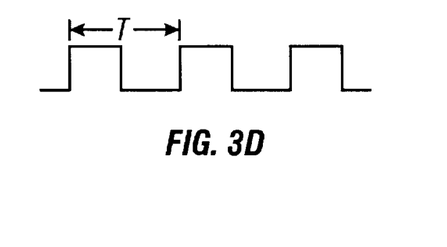
FIG. 3D illustrates one type of pulsing that may be applied to energize the electrode pairs.

The voltage applied to the electrodes in FIG. 3C is pulses as shown in FIG. 3D. As seen in FIG. 3D, the pulse period T is such that L~vT, where L is the distance between vortex wavefronts (shown in FIG. 3C) and v is the flow speed. The first application of the pulse sets up a set of propagating vortex wavefronts as shown in FIG. 3C. The voltage is then turned off and the wavefronts drift with the flow velocity (to the right in FIG. 3C). The vortex wavefronts have traveled a distance L when another pulse is applied to the electrodes. This pulse acts to constructively add to the existing flow of the vortex. In this way, the pulsing resonantly grows and maintains the strength of the vortices.

Unfortunately, the vortex wavefronts thus created are oblique (e.g., diagonal) with the fluid flow direction, illustrated by the arrow 78. Such an oblique wavefront is not optimum for reducing fluid drag. Optimal reduction of fluid drag is produced with vortex wavefronts that are perpendicular to the unperturbed flow direction. It is important that the tangential velocity produced by the vortex be parallel to the flow; only the component along the flow direction contributes to the drag reduction effect. Thus, oblique vortex wavefronts are not efficiently used. A more optimum wavefront would be one that has the tangential velocity parallel with the fluid flow direction, i.e., one wherein the vortex wavefronts are oriented perpendicular to the unperturbed fluid flow.

An additional disadvantage of the energization scheme shown in FIGS. 3A–3C is that the distance between force locations along the vortex wavefront is large. This causes the wavefront not to be as well formed as it might otherwise be if the force locations could be closer together.

Yet a further short coming associated with the energization scheme of FIGS. 3A–3C relates to the positioning of the magnets. That is, as seen in FIG. 3B, the normal component of the Lorentz force L is largest where the magnetic field is weakest. At the position of the maximum magnetic field on the surface of the magnet, no useful force is obtained. Thus, the magnetic force is not employed in a very efficient manner.

Moreover, it should be noted that most structures of a vessel designed to be propelled through a conductive fluid (e.g., vessels that would be used with the present invention) would employ, in one form or another, a curved surface or panel of some type, e.g., a cylindrical shape. Thus, it would be necessary to employ the matrix of cells shown in FIG. 3C on a curved panel. This would, in turn, require the use of curved magnets. Disadvantageously, curved magnets are more expensive than non-curved magnets. Also, in order to increase the magnetic field over the center of a tile or cell, a third magnet is used. Such third magnet causes complications in the magnet assembly.

In order to address the above concerns associated with the embodiment of the invention shown in FIGS. 3A–3C, i.e., in order to create a vortex wavefront that moves in the same direction as the fluid flow, and thereby reduce the drag associated with the fluid flow a maximum amount; and in order to increase the density of the force centers, a preferred embodiment of the present invention utilizes a current multiplexing scheme to selectively energize only certain ones of the electrodes at the same time. Such multiplexing scheme advantageously assures a vortex wavefront that has tangential velocity components parallel to the fluid flow, and thus reduces drag associated with the flow of the fluid over the panel where the control cells are utilized. Further, in order to use the magnetic field more efficiently, and avoid the use of curved magnets, a preferred embodiment of the invention combines current multiplexing with a tangential force panel.

Figure 4A:
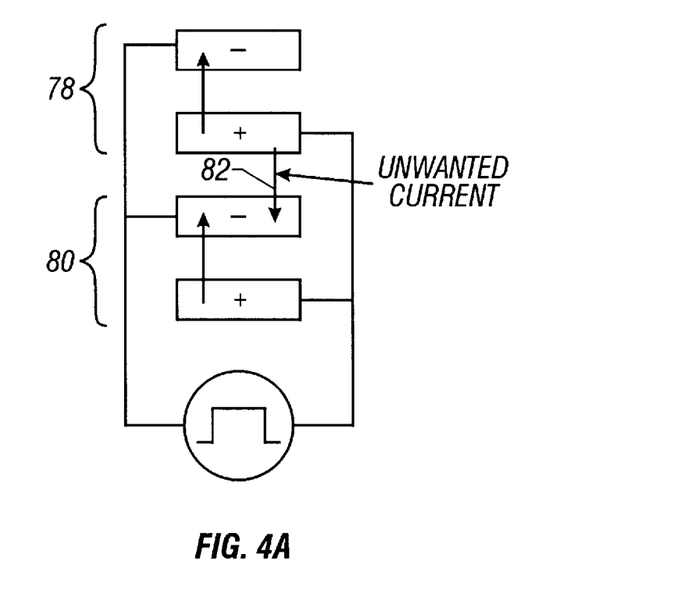
FIG. 4A is a simplified circuit diagram that illustrates how unwanted currents are created when only a single current driver is used.

To illustrate the need for current multiplexing, reference is made to FIG. 4A, which is a simplified circuit diagram that illustrates how unwanted currents may be created when only a single current driver is used. That is, as seen in FIG. 4A, if electrode pair 78 is energized at the same time as is adjacent electrode pair 80, some unwanted current 82 flows between the positive electrode of pair 78 and the negative electrode of pair 80. This unwanted current creates a force vector L that opposes the force vectors L created by the wanted currents, and is thus counterproductive to the formation of the desired vortex wavefront.

Figure 4B:
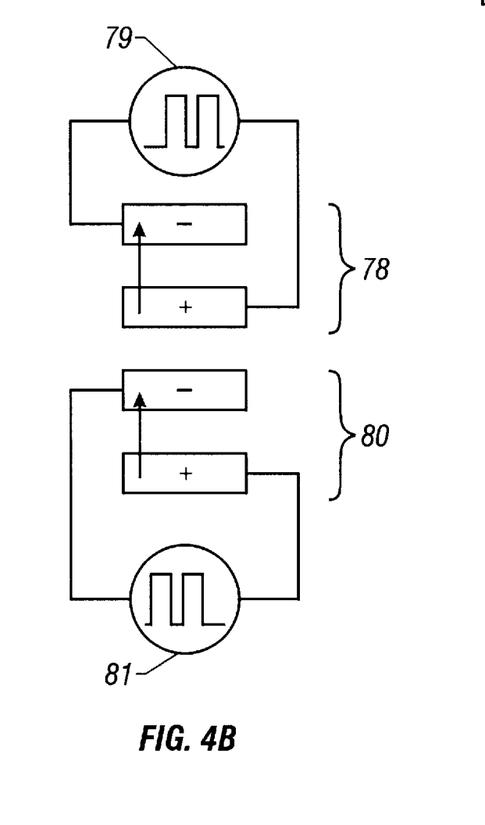
FIG. 4B shows the use of two multiplexed current drivers to avoid the unwanted currents shown in FIG. 4A.

To overcome the problem of unwanted current between adjacent electrode pairs, the present invention multiplexes the energization of the electrode pairs such that adjacent electrode pairs are not energized at the same time. Such multiplexing is illustrated in FIG. 4B. As seen in FIG. 4B, the first pair of electrodes 78 is energized with a first current driver 79, and the second pair of electrodes 80 is energized with a second current driver 81. While only two current sources are shown in FIG. 4B, for illustration, it is to be understood that n current sources could be used, where n is an integer, depending upon the number of phases that are desired.

Figure 5:
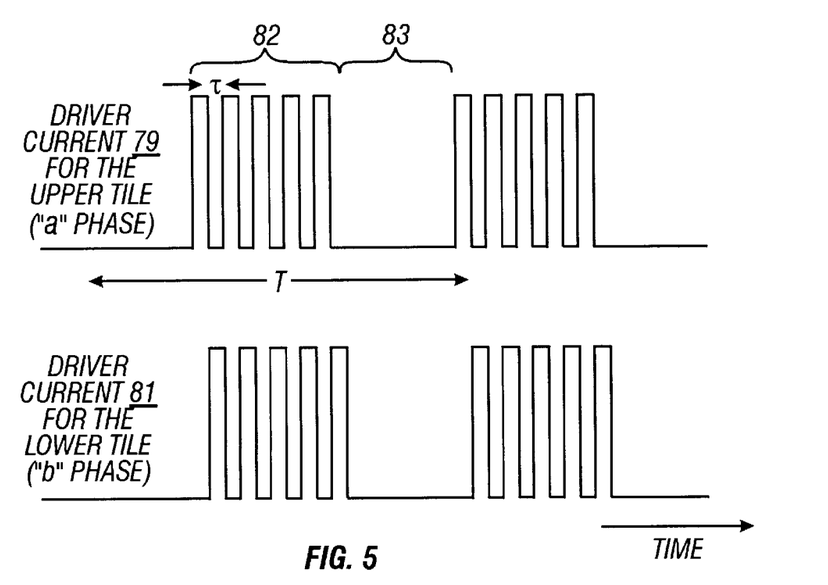
FIG. 5 is a timing waveform diagram that illustrates the concept of current multiplexing.

The timing relationship between the current drivers 79 and 81 is illustrated in FIG. 5. As seen in FIG. 5, the current driver 79 for the electrode pair 78 is never on at the same time as is the current driver 81 for the electrode pair 80. The net result is that unwanted currents do not flow between adjacent electrode pairs.

As further seen in FIG. 5, the current drivers 78 and 80 each include a burst of square waves, each having a period T. In FIG. 5, five such cycles of square waves are shown, comprising a first portion 82 of the current driver waveform, followed by a second portion 83 of the waveform wherein no signal is present. The period T of the envelope of the driver pulses, comprising the first and second portions, is determined by the resonant velocity required to grow the vortex wavefronts. The value of T is determined by the unperturbed flow velocity. By way of example, for a tile column spacing of 1.08 cm, and a flow velocity of about 10 m/sec, the corresponding period T is on the order of about one millisecond. It may also be an integer multiple of this time. For a two phase system, as shown in FIG. 5, each burst of pulses must fit within T/2, or approximately 500 $\mu$sec (microseconds). The minimum value of $\tau$ is about three times the shortest attainable risetime. The value of $\tau$ could, of course, be greater. In one exemplary embodiment, $\tau$ is on the order of about 5 $\mu$sec.

Figure 4C:
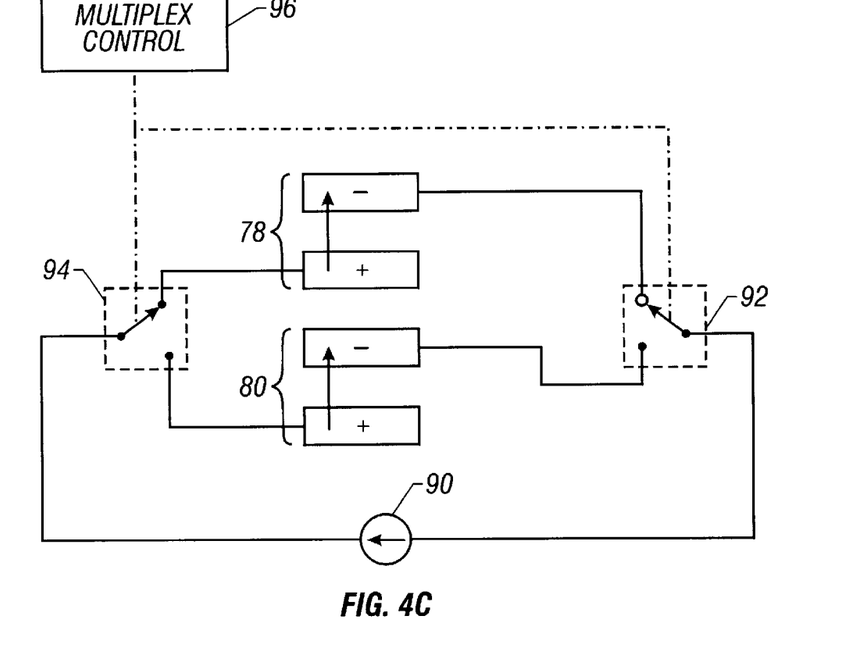
FIG. 4C illustrates the use of a single current driver switched by a multiplex control circuit to create two isolated current drivers.

An alternate multiplexing scheme, using a single current driver 90, is depicted in FIG. 4C. In FIG. 4C, the first pair of electrodes 78 is connected to the current driver 90 through switches 92 and 94. The connection is established so as to create a desired polarity between the electrodes of the pair 78. At the appropriate time, the switches 92 and 94 are switched, by multiplex control circuitry 96, so as to connect the current driver to the electrode pair 80. In this manner, only one electrode pair, 78 or 80, is allowed to energized at the same time.

Clearly, variations of the multiplexing schemes illustrated in FIGS. 4B and 4C and FIG. 5 are evident to those of skill in the art. The important criteria is that adjacent electrode pairs not be energized at the same time, and that the movement of the vortex wavefront be timed so as to match, approximately, the flow velocity of the conductive fluid. As indicated above, for example, for an n phase system, n different current sources could be employed, where n is an integer. By way of illustration, in one embodiment of the invention, eight (n=8) different current sources are used. It is to be understood that an n phase system could be implemented using n separate current or voltage sources, e.g., as shown in FIG. 4B for a two phase system; or through use of a single current or voltage source which is shared between n different pairs of electrodes, as taught in FIG. 4C.

Figure 6:
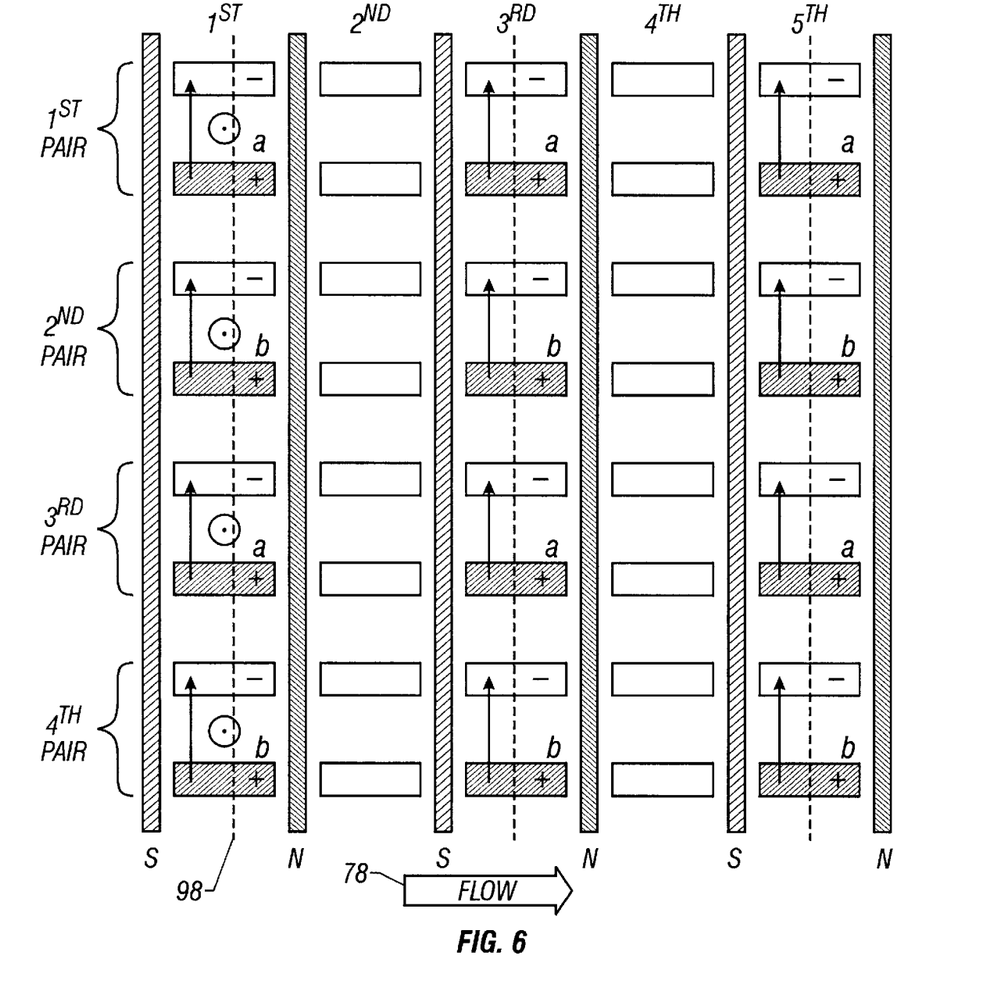
FIG. 6 shows a plan view of one embodiment of an EMTC panel wherein two multiplexed current drivers, labeled a and b are used.

By using two multiplexed currents drivers as shown in FIG. 4B, or an equivalent circuit, a driving pattern as illustrated in FIG. 6 may be obtained. As seen in FIG. 6, adjacent columns are not energized at the same instant of time. That is, as shown in FIG. 6, only the $1^{st}$, $3^{rd}$, and $5^{th}$ columns of electrodes are energized, while the $2^{nd}$ and $4^{th}$ columns remain unenergized. Thus, no unwanted current flow is possible between electrode pairs of adjacent columns. Further, within the energized columns, the first and third electrode pairs are energized with one phase, e.g., the "a" phase; and the second and fourth electrode pairs are energized with a different phase, e.g., the "b" phase. The "a" and "b" phases are controlled so as to be as shown in FIG. 5, or equivalent, so that no adjacent electrode pairs are ever energized at the same time. Thus, no unwanted current flow is possible between adjacent electrode pairs within the same column. As a result, a vortex wavefront 98 is created that is aligned with the fluid flow, i.e., the wavefronts 98 move in substantially the same direction as the fluid flow direction 78.

While not specifically shown in FIG. 6, it is to be understood that the $2^{nd}$ and $4^{th}$ columns of electrodes are similarly energized with a two phase signal at the same time that the $1^{st}$, $3^{rd}$, and $5^{th}$ columns of electrodes are not energized. This pattern of alternate column energization is what moves the resulting vortex wavefront along in the same direction as the fluid flow. Additional phases and columns could also be used, as required, to best match the fluid flow. For example, a driving signal could be applied sequentially to energize three adjacent columns, with only one of the three columns being energized at a given time, and with the driving signal phased so that adjacent electrode pairs within the energized column are not energized at the same time.

A key consideration when using current multiplexing is to quickly change the force pattern (i.e., change the electrode pair that is energized) while the vortex wavefront is above the active cells. That is, the multiplexing time scale must be short compared to the dwell time of the vortex wavefront above the energized cells. Then, the wavefront is hit by a rapid succession of uniformly distributed impulses while it is essentially in one position. As a result, the average force given to the vortex wavefront, which may be conceptually visualized as a "roller" that rolls along the surface of the panel or structure on which the cells are located, is uniformly applied with closely spaced force centers.

In order to address the problems of a weak magnetic field and the inconvenient magnet configuration of the geometry illustrated in FIGS. 3A and 3B, a preferred embodiment of the present invention emphasizes a panel design that generates a Lorentz force tangential to the panel surface. While a force vector normal to the panel surface, as is established, e.g., using a configuration such as that shown in FIGS. 3A and 3B, produces fluid velocity perturbations that are also normal (perpendicular) to the panel surface (upward or downward), the nearly incompressible nature of the fluid motion also produces fluid velocity perturbations tangential (parallel) to the panel surface. It is these tangential velocity perturbations which are primarily responsible for drag reduction. Hence, it is a feature of the preferred embodiment of the present invention to provide a control cell design, or panel design, that directly produces tangential velocity perturbations.

Figure 7A:
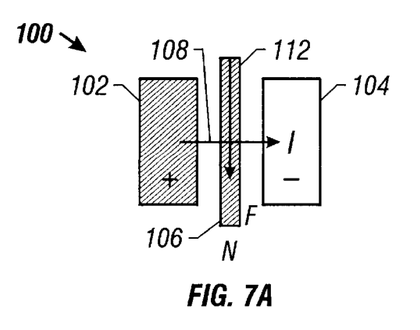
FIG. 7A shows a plan view of a preferred configuration of a basic control cell made in accordance with the present invention.
Figure 7B:
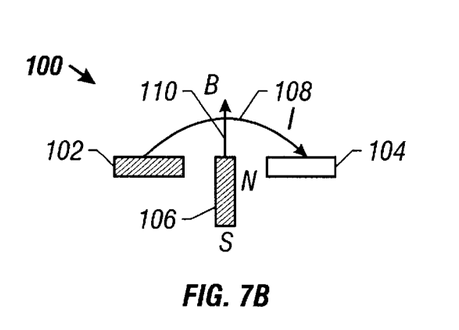
FIG. 7B shows a side view of the cell shown in FIG. 7A.

The preferred configuration for the control cell design that produces tangential velocity perturbations is as shown in FIGS. 7A and 7B. As seen in FIGS. 7A and 7B, a basic building block 100 for producing Lorentz forces tangential to the surface includes a pair of spaced apart electrodes 102 and 104 mounted on the surface of a tile (not shown). One of these electrodes, e.g., electrode 102, is biased to be positive relative to the other electrode, e.g., electrode 104. Thus when the electrodes are immersed in a conductive fluid, a current I flows through the conductive fluid along the surface of the tile from the positive electrode 102 to the negative electrode 104. The current flow I is represented in FIGS. 7A and 7B by the arrow 108.

As further seen in FIGS. 7A and 7B, the basic building block 100 also includes a magnet 106 positioned so that one of its poles, e.g., the north pole, is approximately mid-way between the electrodes 102 and 104. This magnet 106 thus creates a magnetic field B, represented by the arrow 110, that is perpendicular to the panel surface. The electric current I and the magnetic field B combine to produce a Lorentz force F that is tangential (parallel and immediately adjacent the surface boundary) with the surface of the panel. Such force F is represente din FIG. 7A by the arrow 112.

Advantageously, as seen in FIGS. 7A and 7B, the force vector F is created at the location where the magnetic field B is the strongest, immediately above the pole of the magnet that lies intermediate the electrodes 102 and 104. That is, the current I passes over the pole of the magnet. The magnetic field is normal to the surface of the magnet pole, so a tangential Lorentz force F is produced. The magnetic field B is strongest at the magnet surface and so a very strong Lorentz force F is obtained.

Figure 8:
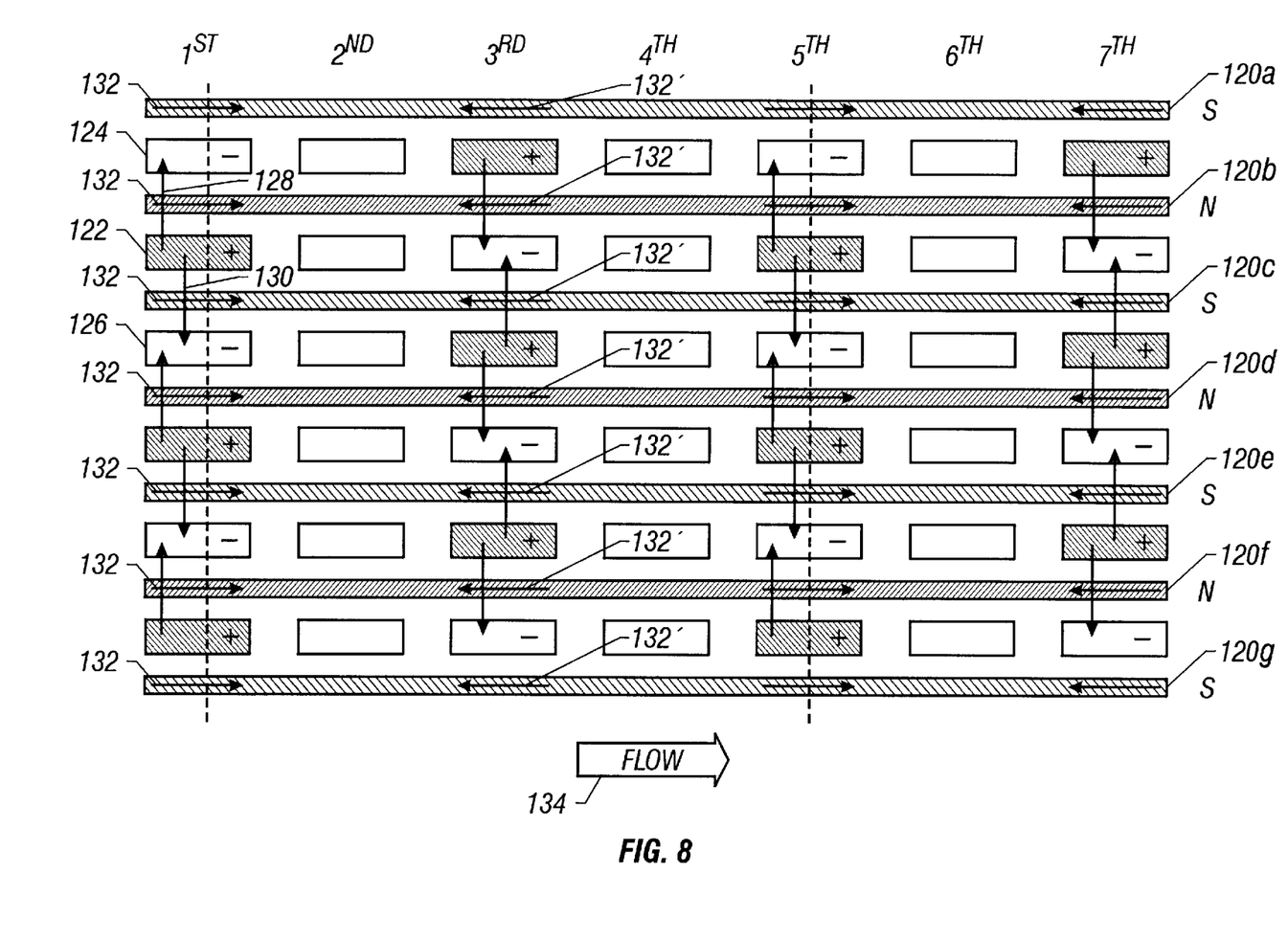
FIG. 8 illustrates one example of a tangential Lorentz Force EMTC panel made in accordance with the present invention.

Turning next to FIG. 8, there is shown an example of how a tangential Lorentz Force EMTC panel may be configured in accordance with the present invention. As seen in FIG. 8, a series of magnets 120a, 120b, 120c, 120d, 120e, 120f and 120g, with alternating pole positions (i.e., with magnets 120a, 120c, 120e and 120g having their South poles nearest the panel surface; and with magnets 120b, 120d and 120f having their North poles nearest the panel surface), are arranged in a parallel pattern, creating rows of magnets (for the orientation shown in FIG. 8). Columns of electrodes, e.g., seven columns of electrodes, are then configured, with one electrode residing in between each magnet.

An important characteristic feature of the tangential Lorentz force geometry is that it produces equal and oppositely directed tangential forces. The first column of electrodes produce tangential Lorentz forces, 132, that are directed to the right in FIG. 8. The third column of electrodes produce tangential Lorentz forces, 132', that are directed to the left in FIG. 8. These forces are seen to continue to alternate in the fifth and seventh columns. The net tangential force over the entire panel is zero.

A driver circuit (not shown in FIG. 8) selectively biases the electrodes so that each electrode in a given column of electrodes supplies current to its two adjacent neighbors. For example, electrode 122, in the $1^{st}$ column of electrodes intermediate magnets 120b and 120c, is biased to be positive relative to neighboring electrodes 124 and 126, also located within the $1^{st}$ column of electrodes. Such biasing causes a current I to flow from electrode 122 to electrodes 124 and 126, as represented by the arrows 128 and 130. This current interacts with the magnetic field B to produce a Lorentz force F directly over the magnet, all along the energized column. Such forces F are represented by the arrows 132 in FIG. 8 in the $1^{st}$ column. These forces F combine to produce a "roller" perturbation in the fluid velocity that noticeably reduces the drag associated with flow of the fluid over the panel in the direction illustrated by the arrow 134.

The energized columns, which for the "snap-shot" in time illustrated in FIG. 8 are the $1^{st}$, $3^{rd}$, $5^{th}$ and $7^{th}$ columns, are separated by one or more non-energized columns in order to minimize unwanted streamwise current flow. The direction of the tangential force reverses from column to column, thereby insuring that no net tangential momentum is exchanged with the fluid. The pattern shown in FIG. 8 is on for a period of time, then off, and then shifts to the right one tile, then turns on again. Such pattern is propagated at the resonant velocity.

Figure 9:
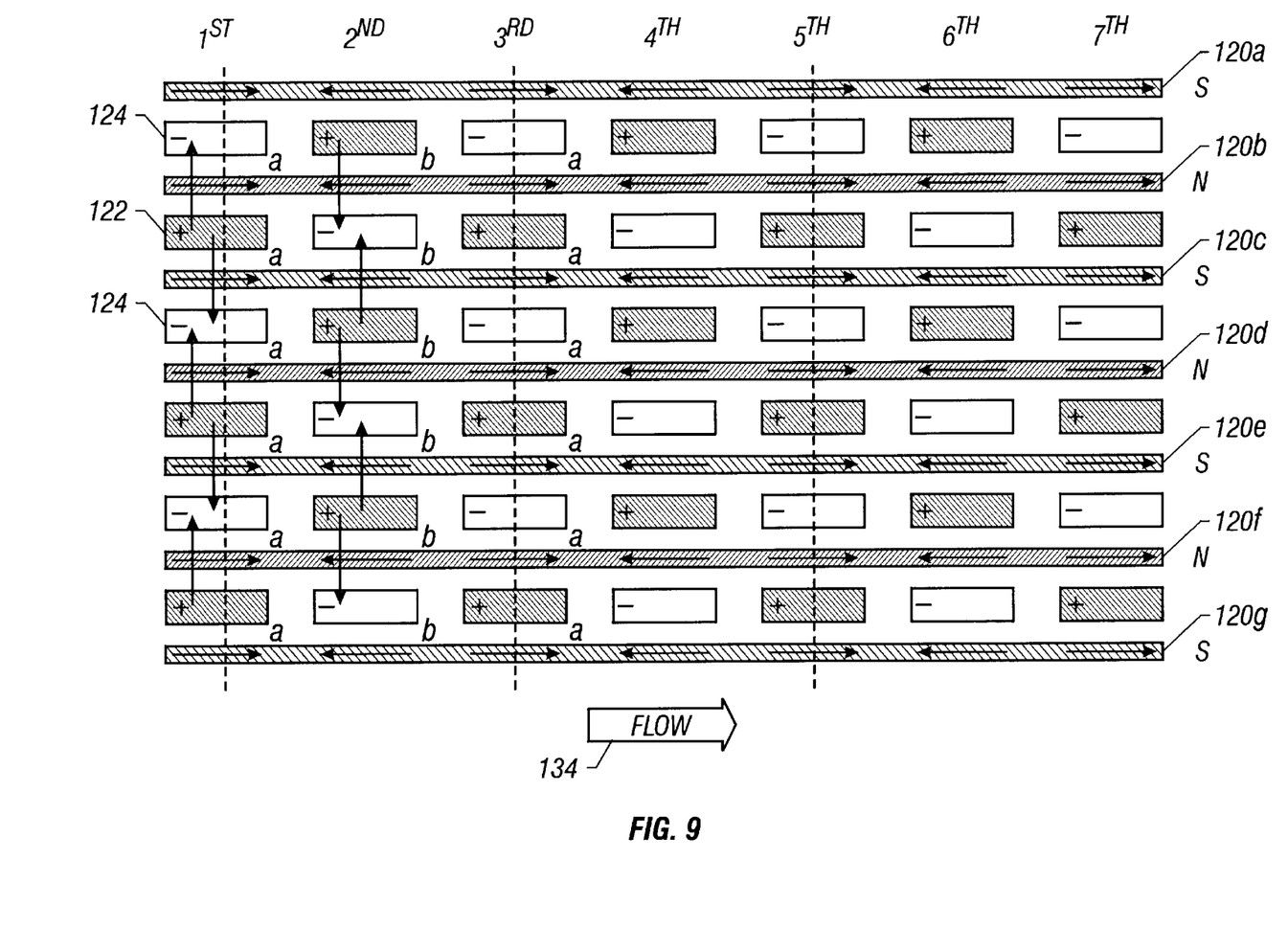
FIG. 9 depicts a preferred example of a tangential force EMTC panel with multiplexed current driving made in accordance with the present invention.

Next, with reference to FIG. 9, there is shown a tangential force panel similar to that shown in FIG. 8, but utilizing multiplexed current drivers. As seen in FIG. 9, with multiplexed current drivers, the non-energized columns in FIG. 8 may be eliminated so that all of the electrodes are energized. For example, the electrodes in the $1^{st}$ column are energized with an "a" phase driver signal, while the electrodes in the $2^{nd}$ column are energized with a "b" phase driver signal, where the "a" and "b" phased signals are substantially as shown in the waveform diagram of FIG. 5. With such a multiplexed scheme, wherein all of the electrodes are energized, the use of the panel space is optimized. As the pattern propagates to the right, the cathodes and anodes exchange their roles. That is, whereas electrode 122 is positive relative to its neighbor electrodes in the same column, such electrode becomes negative relative to its neighbors during the next cycle.

As described above, it is thus seen that the present invention provides beneficial control of fluid motion over a surface, e.g., to reduce drag as a conductive fluid flows over the surface. More particularly, it is seen that through the use of a time-multiplexed current driver, Lorentz forces may be selectively created so as to establish a vortex wavefront, or "roller", having tangential velocity components that significantly reduce the drag associated with the flow of a conductive fluid over the control surface.

As further described above, it is seen that the invention provides a control panel configuration that optimally utilizes the available panel space in order to produce tangential force vectors, directly over the magnet, all along the length of an energized column, which force vectors create coordinated fluid perturbations, or "rollers", which reduce drag associated with flow of a conductive fluid over the panel.

While the invention herein disclosed has been described by means of specific embodiments and applications thereof, numerous modifications and variations could be made thereto by those skilled in the art without departing from the scope of the invention set forth in the claims.

What is claimed is:

1. Apparatus for affecting the flow of a conductive fluid over a control surface comprising:

a matrix of electrodes spread over a front surface of the control surface;

means for biasing (or energizing) selected electrodes in columns so that the polarity of the electrodes in a given electrode column alternates between a positive electrode and a negative electrode, and so that an electrical current flows from a positive electrode in the electrode column through the conductive fluid to adjacent negative electrodes on either side of the positive electrode in the electrode column, and wherein the biasing means includes means for minimizing undesired lateral current flow from one electrode column to another;

means for generating a magnetic field having magnetic flux lines substantially orthogonal to the electrical current flowing through the conductive fluid and substantially perpendicular to the control surface near a boundary layer between the control surface and conductive fluid; and said means for biasing said selected electrodes in columns so that an electrical current flows from said positive electrode in the electrode column through the conductive fluid to said adjacent negative electrodes on either side of said positive electrode in the electrode column interacting with said means for generating a magnetic field having magnetic flux lines substantially orthogonal to said electrical current flows such that a tangential Lorentz force substantially orthogonal to both the electrical current and magnetic flux lines and substantially tangential to the control surface is created in equal and oppositely-directed pairs, which tangential Lorentz force affects the flow of the conductive fluid over the control surface.

2. The apparatus of claim 1 wherein the means for generating a magnetic field comprises a plurality of permanent magnets, each positioned intermediate to the anode and cathode electrodes of a given electrode column so as to provide alternating magnetic poles within the electrode column.

3. The apparatus of claim 2 wherein each magnet of the plurality of permanent magnets comprises a magnetic strip having opposing magnetic poles along opposite sides thereof, with one side, and hence one magnetic pole, being placed against the control surface at a location midway between adjacent electrodes within the column of electrodes.

4. The apparatus of claim 3 wherein each magnetic strip extends laterally from one electrode column to adjacent electrode columns within the matrix of electrodes.

5. The apparatus of claim 4 wherein each magnetic strip is mounted to a back surface of the control surface, the front surface of the control surface comprising the surface whereon the electrodes are mounted and the surface which is exposed to the conductive fluid.

6. The apparatus of claim 1 wherein the means for minimizing undesired lateral current flow from one electrode column to another comprises selectively biasing no more than every other electrode column, whereby each biased or energized electrode column is separated by at least one non-biased or non-energized electrode column.

7. The apparatus of claim 6 wherein the biasing means further includes means for energizing selected electrodes within a given electrode column for a first period of time, then de-energizing the selected electrodes of the given electrode column for a second period of time, and then shifting laterally to an adjacent electrode column so that the selected electrodes within the adjacent electrode column are energized for the first period of time and de-energized for the second period of time, and then shifting laterally again in the same direction, and continuing this process, so that energized electrode columns propagate through the matrix of electrodes in a desired direction.

8. The apparatus of claim 1 wherein the biasing means includes n separate current sources.

9. The apparatus of claim 1 wherein the means for minimizing lateral current flow from one electrode column to another comprises time multiplexing means for biasing or energizing selected electrode pairs in the electrode columns so that adjacent electrode pairs in adjacent electrode columns are never biased or energized at the same time.

10. The apparatus of claim 1 wherein the matrix of electrodes is mounted on the hull of an ocean-going vessel, and wherein said tangential Lorentz forces are created using selected energized electrode columns to control the drag of the hull as the vessel moves through conductive sea water.

11. The apparatus of claim 10 wherein the tangential Lorentz forces are created to reduce the drag of the hull as it is propelled through the conductive sea water.

12. The apparatus of claim 10 wherein the tangential Lorentz forces are created to selectively increase and decrease the drag of the hull of the vessel to help steer the vessel as it moves through the conductive sea water.

13. The apparatus of claim 10 wherein the tangential Lorentz forces are created to selectively increase the drag of the hull to create a braking force to slow down the vessel as it is moves through the conductive sea water.

14. The apparatus of claim 1 wherein the matrix of electrodes is mounted on the shell of a space-traveling vessel, and wherein said tangential Lorentz forces are created using selected energized electrode columns to control drag between the shell and an ionized atmosphere.

15. The apparatus of claim 14 wherein the tangential Lorentz forces reduce the drag of the shell as it moves through the ionized atmosphere.

16. The apparatus of claim 14 wherein the tangential Lorentz forces are used to selectively increase and decrease the drag of the shell of the vessel to help steer the vessel as it moves through the ionized atmosphere.

17. The apparatus of claim 14 wherein the tangential Lorentz forces are used to increase the drag of the shell to create a braking force that slows down the vessel as it is moves through the ionized atmosphere.

18. The apparatus of claim 1 for affecting the flow of said conductive fluid over said control surface further comprising:
   a vortex wavefront formed by said tangential Lorentz force, said vortex wavefront being transverse to the direction of flow of said conductive fluid over said control surface.

19. The apparatus of claim 18 wherein said vortex wavefront, being transverse to the direction of flow of the conductive fluid over said control surface, propagates in substantially the same direction as said conductive fluid flow.

20. The apparatus of claim 18 wherein said vortex wavefront, being transverse to the direction of flow of the conductive fluid over said control surface, propagates in a direction substantially opposite of the direction of flow at said conductive fluid.

21. A method for affecting the flow of a conductive fluid over a control surface comprising the steps of:
   a. providing a control surface including a matrix of electrodes spread over a front surface of the control surface;
   b. energizing selected electrodes in columns so that the polarity of the electrodes in a given electrode column alternates between a positive electrode and a negative electrode, and so that an electrical current flows from a positive electrode in the electrode column through the conductive fluid to adjacent negative electrodes on either side of the positive electrode in the electrode column, and wherein the energizing minimizes undesired lateral current flow from one electrode column to another;
   c. generating a magnetic field having magnetic flux lines substantially orthogonal to the electrical current flowing through the conductive fluid and substantially perpendicular to the control surface near a boundary layer between the control surface and conductive fluid; and
   d. producing a Lorentz force by interacting said electrical current flowing through the conductive fluid with said magnetic field having magnetic flux lines, said Lorentz force being substantially orthogonal to both the electrical current and magnetic flux lines and substantially tangential to the control surface, said tangential Lorentz force affecting the flow of the conductive fluid over the control surface.

22. The method for affecting the flow of a conductive fluid over a control surface of claim 21 wherein said step of producing a tangential Lorentz force further includes the step of affecting the flow of the conductive fluid over the control surface such that a vortex wavefront is formed at right angles to the direction of conductive fluid flow over said control surface.

23. The method for affecting the flow of a conductive fluid over a control surface of claim 21 wherein said step of energizing selected electrodes is accomplished using current drivers which are time multiplexed.

24. The method for affecting the flow of a conductive fluid over a control surface of claim 22, wherein said step of energizing selected electrodes is accomplished using current drivers which are time multiplexed at a time period determined by a resonant frequency required to magnify said vortex wavefronts.

25. The method for affecting the flow of a conductive fluid over a control surface of claim 22, wherein said step of energizing selected electrodes is accomplished using current drivers which are time multiplexed at a time period selected to synchronize the movement of said vortex wavefronts to approximately match a flow rate of said conductive fluid.

26. A tangential Lorentz force panel for fluid motion control comprising:
    an array of electrodes arranged in columns on a front surface of a panel, the panel being adapted for movement through a conductive fluid, with the front surface of the panel being exposed to the conductive fluid;
    means for energizing the electrodes within a given column to exhibit alternating polarities from one end of the column to the other, whereby electrical current sourced from a positive electrode flows through the conductive fluid to adjacent negative electrodes, and electrical current sunk at a negative electrode is received through the conductive fluid from adjacent positive electrodes, the electrical current flowing through the conductive fluid in a direction that is substantially parallel to the panel surface;
    means for generating a magnetic field having magnetic flux lines that are substantially normal to the panel surface at the boundary layer between the front surface and the conductive fluid at a location approximately midway between adjacent electrodes in the column,
    equal and oppositely-directed tangential Lorentz forces being created through the interaction of the electrical current and the magnetic flux, which tangential Lorentz forces affect the flow of the conductive fluid over the front surface of the panel.

27. The Lorentz force panel of claim 26 further including means for minimizing undesired lateral electrical current flow between adjacent electrode columns.

28. The Lorentz force panel of claim 27 wherein the means for minimizing undesired lateral electrical current flow comprises time multiplexing means for energizing adjacent electrode columns at different times.

29. Apparatus for controlling flow of a conductive fluid over a control surface comprising:
    a matrix of electrodes spread over the control surface in columns;
    a means for biasing selected electrodes in a multiplicity of pairs so that two of the electrodes within the matrix of electrodes function as an electrode pair, with each electrode pair having an anode electrode and a cathode electrode, and so that an electrical current flows from the anode electrode of each electrode pair through the conductive fluid to the cathode electrode of the electrode pair;
    a means for generating a magnetic field having magnetic flux lines substantially orthogonal to the electrical current flowing through the conductive fluid between the anode and cathode electrodes;
    said electrical current and said magnetic field interacting to form a Lorentz force orthogonal to both the electrical current and magnetic flux lines, which Lorentz force generates a vortex wavefront in said conductive fluid;
    said biasing means further including a means for time multiplexing the electrical current to assure a pattern of Lorentz forces such that said vortex wavefront is substantially transverse to a direction of flow of said conductive fluid, said wavefront also propagating a direction substantially parallel to said direction of flow.

30. The apparatus of claim 29 wherein said biasing means includes:
    a current source that alternatively biases a first group of the electrode pairs to cause a first electrical current to flow between the anode and cathode of each electrode pair within the first group of electrode pairs and that biases a second group of the electrode pairs to cause a second electrical current to flow between the anode and cathode of each electrode pair within the second group of electrode pairs.

31. The apparatus of claim 29 wherein the time multiplexing means comprises:
    a first current driver that biases said first group of the electrode pairs to cause the first electrical current to flow between the anode and cathode of each electrode pair within the first group of electrode pairs,
    a second current driver that biases the second group of the electrode pairs to cause the second electrical current to flow between the anode and cathode of each electrode pair within the second group of electrode pairs, and
    a timing means for controlling the first and second current sources so that only one current source is operative at any given time.

32. The apparatus of claim 29 wherein said biasing means includes:
    a current source that alternatively biases a first group of the electrode pairs while deactivating a second group of said electrode pairs and then biases said second group of the electrode pairs while deactivating said first group of said electrode pairs, said alternating bias and deactivation occurring in periodic pulses while the vortex wavefront passes above said first group and said second group of electrode pairs, the period T of said pulses being determined by the resonant velocity required to maximize the vortex wavefront intensity.

33. The apparatus of claim 32, wherein said current source alternating bias and deactivation pulses may have a period which is an integral multiple of said period T of said pulses being determined by the resonant velocity required to maximize the vortex wavefront intensity.

34. An apparatus for generating at least one vortex wavefront adjacent to a control surface as the control surface flows through a conductive fluid, the apparatus comprising:
    a matrix of electrodes spread over the control surface in columns of adjacent electrode pairs;
    a means for energizing selected electrode pairs such that each energized electrode pair includes an anode and a cathode and electrical current flows through the conductive fluid from the anode to the cathode of each selected electrode pair;
    a means for generating a magnetic field having magnetic flux lines which are substantially orthogonal to the electrical current flowing between the anode and cathode of each selected electrode pair;

the electrical current and the magnetic field interacting to form a Lorentz force orthogonal to both the electrical current and the magnetic flux lines, which Lorentz force generates a vortex wavefront in said conductive fluid;

said energizing means further including a means for time multiplexing the electrical current to assure a pattern of Lorentz forces such that said vortex wavefront is substantially transverse to the conductive fluid flow, said wavefront also propagating a direction substantially parallel to the direction of said conductive fluid flow.

35. An apparatus as in claim 34 wherein said means for time multiplexing the electrical current multiplexes the energization of said electrode pairs such that adjacent electrode pairs are not energized at the same time.

36. An apparatus as in claim 34, wherein said matrix of electrodes spread over the control surface in columns of adjacent electrode pairs includes each column having an alternating plurality of first electrode pairs and second electrode pairs;

said energizing means including a first current driver for energizing said first electrode pairs and a second current driver for energizing said second electrode pairs; and said means for time multiplexing controls the first and second current drivers such that only one of said first electrode pairs and said second electrode pairs are energized at the same time.

37. An apparatus as in claim 36, wherein said means for time multiplexing the first and second current drivers such that only one of said first electrode pairs and said second electrode pairs are energized at the same time alternates energizing said first electrode pairs and said second electrode pairs in pulses having a period which grows and maintains the strength of said vortex wavefront.

38. An apparatus as in claim 36, wherein said means for time multiplexing the first and second current drivers such that only one of said first electrode pairs and said second electrode pairs are energized at the same time alternates energizing said first electrode pairs and said second electrode pairs in pulses having a period which is approximated by a function of a distance between said at least one vortex wavefronts and a flow speed of said conductive fluid.

39. An apparatus as in claim 37, wherein said energizing pulses of said time multiplexing means include a burst of periodic current which alternates energizing said first electrode pairs and said second electrode pairs over said pulse period in a plurality of cycles, the number of said plurality of cycles being determined by a function of a flow speed of said conductive fluid over said control surface.

40. An apparatus as in claim 39, wherein said burst of periodic current comprises a burst of square waves.

41. An apparatus as in claim 37, wherein said energizing pulses of said time multiplexing means include a burst of periodic current which alternates energizing said first electrode pairs and said second electrode pairs over said pulse period in a plurality of cycles being determined by an integral multiple of a function of a flow speed of said conductive fluid over said control surface.

42. An apparatus as in claim 41, wherein said burst of periodic current comprises a burst of square waves.

43. An apparatus as in claim 34, wherein said matrix of electrodes spread over the control surface in columns of adjacent electrode pairs includes each column having a plurality of n electrode pairs;

said energizing means including n current drivers for energizing each of said n electrode pairs; and said means for time multiplexing controls the n current drivers such that only one of said n pairs is energized at the same time.

44. An apparatus as in claim 34, wherein said matrix of electrodes spread over the control surface in columns of adjacent electrode pairs includes each column having an alternating plurality of first electrode pairs and second electrode pairs;

said energizing means including a single current driver operatively connected to a switching means for energizing said first electrode pairs and said second electrode pairs; and said means for time multiplexing controls the switching means such that only one of said first electrode pairs and said second electrode pairs are energized at the same time.

\* \* \* \* \*